United States Patent [19]

Schurter et al.

[11] Patent Number: 5,062,455

[45] Date of Patent: Nov. 5, 1991

[54] PRESSURE VESSEL WITH DIAPHRAGM COMPRESSION SEAL

[75] Inventors: Robert M. Schurter, Elm Grove, Wis.; Robert H. Palmerton, New Dundee, Canada

[73] Assignee: A. O. Smith Corporation, Milwaukee, Wis.

[21] Appl. No.: 399,596

[22] Filed: Aug. 25, 1989

[51] Int. Cl.$^5$ ............................................. F16L 55/04
[52] U.S. Cl. .................................... 138/30; 220/530; 92/98 R; 277/209
[58] Field of Search ........................ 138/30; 220/85 B; 92/98 R; 277/209, 210, 211

[56] References Cited

U.S. PATENT DOCUMENTS

| | | | |
|---|---|---|---|
| 20,877 | 7/1858 | Haskins | 174/2 |
| 1,036,043 | 8/1912 | Westinghouse | 267/64.15 |
| 1,579,536 | 4/1926 | Hodgson | 92/100 |
| 2,349,321 | 5/1944 | White | 138/30 |
| 2,378,467 | 6/1945 | De Kiss | 138/30 |
| 2,394,401 | 2/1946 | Overbeke | 138/30 |
| 2,401,791 | 6/1946 | Overbeke | 138/30 |
| 2,442,313 | 12/1946 | Price | 277/166 |
| 2,721,580 | 10/1955 | Greer | 138/30 |
| 2,738,809 | 3/1956 | Mercier | 138/30 |
| 2,742,785 | 4/1956 | St. Clair | 73/279 |
| 3,035,614 | 5/1962 | Kirk, Jr. | 138/30 |
| 3,136,229 | 6/1964 | Bauman | 92/99 |
| 3,137,317 | 6/1964 | Peters | 138/30 |
| 3,153,988 | 10/1964 | Warstler | 92/119 |
| 3,165,229 | 1/1965 | Paul | 220/85 R |
| 3,174,658 | 3/1965 | Wittenberg et al. | 222/386.5 |
| 3,288,168 | 11/1966 | Mercier et al. | 138/30 |
| 3,316,939 | 5/1967 | Mercier | 138/30 |
| 3,425,593 | 2/1969 | Kramer et al. | 220/85 B |
| 3,623,512 | 11/1971 | Ellwanger et al. | 138/30 |
| 3,750,411 | 8/1973 | Shimizu | 405/135 |
| 3,788,358 | 1/1974 | Taki | 138/30 |

(List continued on next page.)

FOREIGN PATENT DOCUMENTS 2240989 3/1974 Fed. Rep. of Germany .
2242942 3/1974 Fed. Rep. of Germany .

*Primary Examiner*—Frankie L. Stinson
*Attorney, Agent, or Firm*—Andrus, Sceales, Starke & Sawall

[57] ABSTRACT

A pressure vessel (10) has partially telescoped upper and lower shells (12, 14), a diaphragm (20a) with a peripheral edge (26) trapped and sealed between the shells (12, 14), and compression structure (50, 52) on the inner side (44a) of the peripheral edge (26) of the diaphragm (20a) reducing the amount of diaphragm material requiring compression and also increasing the compression of the bulge (42) of the peripheral edge (26) of the diaphragm (20a) in the bulge (34) of the upper wall section (18) of the lower shell (14) to enhance the seal thereat. The compression structure includes one or more internal ribs (50, 52) on the inner side (44a) of the peripheral edge (26) of the diaphragm (20a) such that the inner cylindrical wall portion (38) of the lower wall section (16) of the upper shell (12) compresses the internal ribs (50, 52) and subjects the bulge (42) of the peripheral edge (26) of the diaphragm (20a) to a direct force to provide the noted increased compression of the bulge (42) of the peripheral edge (26) of the diaphragm (20a), and such that the inner cylindrical wall portion (38) of the lower wall section (16) of the upper shell (12) engages and compresses the first rib (50) to apply a radial outward force compressing the peripheral edge (26) of the diaphragm (44a) radially outwardly against a tapered wall portion (54) of the upper wall section (18) of the lower shell (14) which also compresses the peripheral edge (26) of the diaphragm (44a) downwardly into the widest radial area portion of the bulge (34) of the upper wall section (18) of the lower shell (14) to enhance the seal thereat, all while still maintaining ease of telescoped assembly of the shells (12, 14), and such that the radial force on the ribs (50, 52) from the inner cylindrical wall portion (38) of the lower wall section (16) of the upper shell (12) is allowed to spread the ribs (50, 52) axially into less compressed areas (74, 82) to enable the noted reduction in the amount of diaphragm material requiring compression.

2 Claims, 1 Drawing Sheet

U.S. PATENT DOCUMENTS

| | | | |
|---|---|---|---|
| 3,878,867 | 4/1975 | Dirks | 138/30 |
| 3,930,656 | 1/1976 | Jelinek | 277/180 |
| 3,960,178 | 6/1976 | Mercier | 138/30 |
| 4,010,773 | 3/1977 | Bihlmaier | 138/30 |
| 4,098,297 | 7/1978 | Zahid | 138/30 |
| 4,129,025 | 12/1978 | Carey et al. | 72/348 |
| 4,234,016 | 11/1980 | Horino | 138/30 |
| 4,295,492 | 10/1981 | Zahid | 138/30 |
| 4,315,527 | 2/1982 | Donnenberg et al. | 138/30 |
| 4,321,949 | 3/1982 | Mercier | 138/30 |
| 4,335,887 | 6/1982 | Benassi | 277/84 |
| 4,368,894 | 1/1983 | Parmann | 277/209 |
| 4,426,094 | 1/1984 | Antonini | 63/15.4 |
| 4,466,472 | 8/1984 | Hendrickx | 152/429 |
| 4,474,215 | 10/1984 | Richter et al. | 138/30 |
| 4,492,013 | 1/1985 | Porel | 29/890.06 |
| 4,572,523 | 2/1986 | Guettouche | 277/209 |
| 4,598,915 | 7/1986 | Gilbert | 277/207 A |
| 4,667,841 | 5/1987 | Belle | 220/22 |
| 4,789,167 | 12/1988 | Housas | 277/207 A |

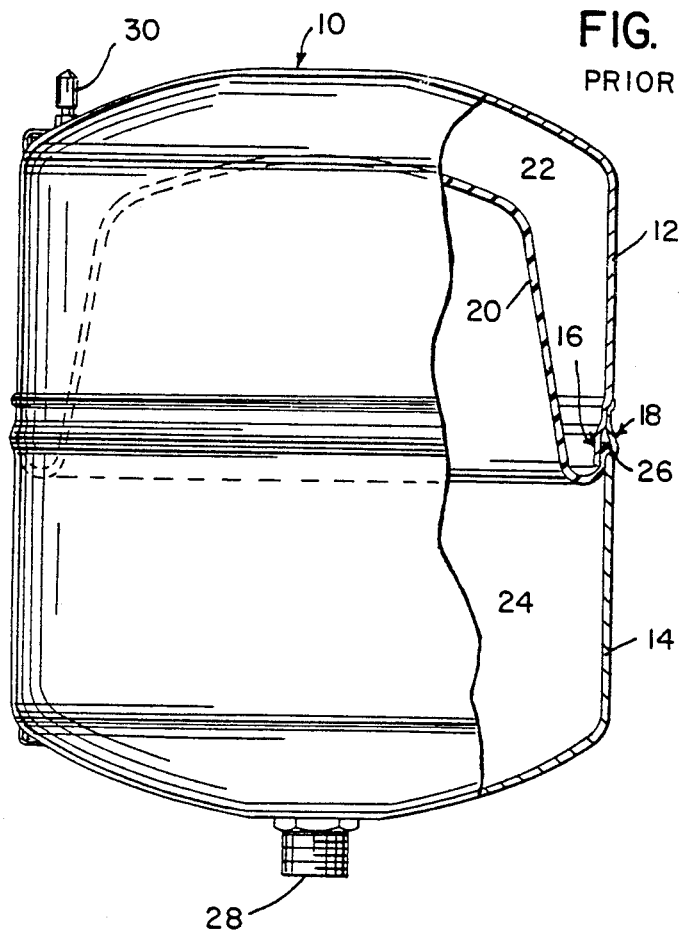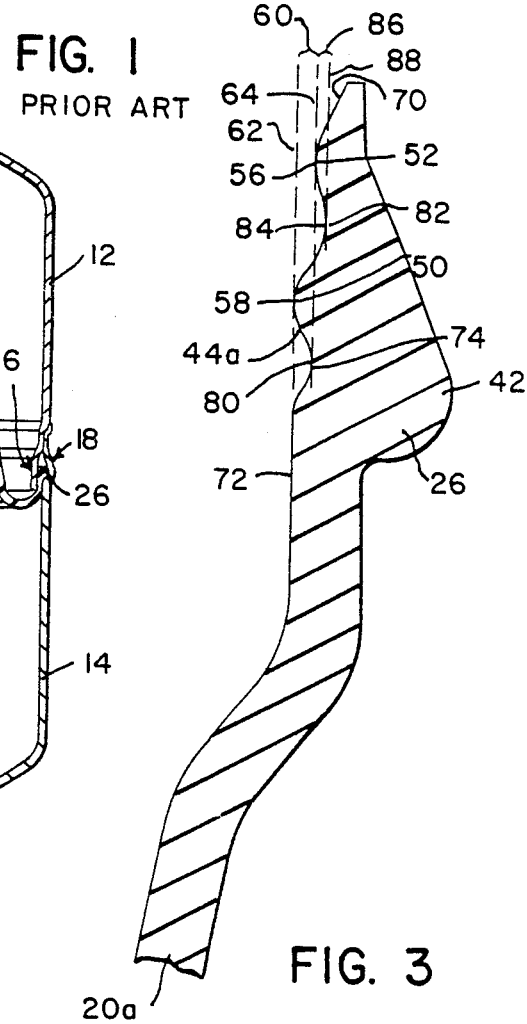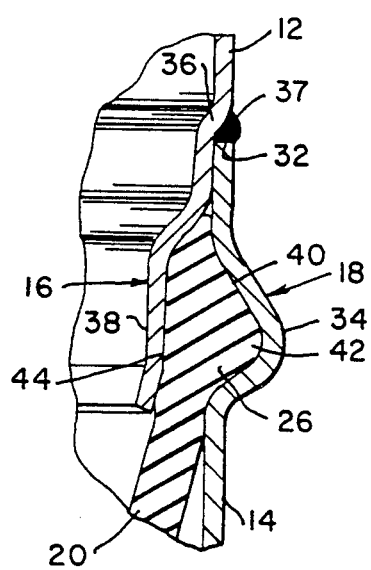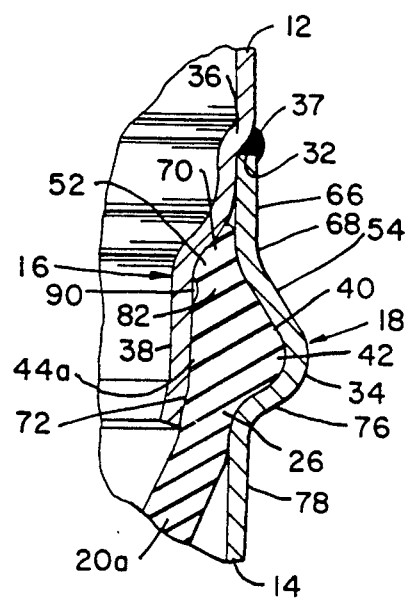
FIG. 1 PRIOR ART
FIG. 3
FIG. 2 PRIOR ART
FIG. 4

PRESSURE VESSEL WITH DIAPHRAGM COMPRESSION SEAL

BACKGROUND AND SUMMARY

The invention arose during continuing development efforts in improving pressure vessels such as shown in U.S. Pat. No. 4,474,215, incorporated herein by reference.

In the present invention, improvements are made in the diaphragm peripheral edge seal which provide higher compression of the rubber diaphragm material at the sealing point, yet still enable ease of assembly. This is accomplished by reducing the amount of diaphragm material requiring compression. Instead, only certain areas are compressed and are chosen to subject the sealing area to a direct force. A radial outward force compresses the peripheral edge of the diaphragm radially outwardly against a tapered wall portion of the vessel shell which compresses the outer side of the diaphragm edge downwardly into the widest radial area portion of a bulge in the shell wall to enhance the seal thereat. The radial force of the compressed area is also allowed to spread out the diaphragm material along the inner side of the diaphragm edge into less compressed areas to enable the noted reduction in the amount of diaphragm sealing material requiring compression, all while improving the seal and at the same time maintaining ease of assembly.

BRIEF DESCRIPTION OF THE DRAWINGS

FIG. 1 is a side elevation view, partially broken away, of a pressure vessel known in the prior art.

FIG. 2 is an enlarged sectional view of a portion of FIG. 1.

FIG. 3 is a side sectional view of a portion of a diaphragm in accordance with the invention, in preassembled, precompressed form.

FIG. 4 is a view like FIG. 2 but shows the assembled compressed condition of the diaphragm of FIG. 3.

DETAILED DESCRIPTION

FIG. 1 shows a pressure vessel 10 comprising upper and lower cylindrical vessel shells 12 and 14 having facing open mouths received one within the other in partially overlapping telescoped relation. Upper shell 12 has a lower wall section 16 received within and overlapping an upper wall section 18 of lower shell 14. A resilient flexible diaphragm 20 is disposed within the vessel and separates the latter into variable volume chambers 22 and 24. Diaphragm 20 has a peripheral edge 26 received and sealed between lower wall section 16 of upper shell 12 and upper wall section 18 of lower shell 14.

In operation, a fluid such as water is pumped into chamber 24 through port 28 which causes diaphragm 20 to move upwardly and compress the air in chamber 22. The pressurized air in chamber 22 is thus available to push diaphragm 20 downwardly when fluid is no longer being pumped in through port 28, which downward movement of diaphragm 20 pushes water in chamber 24 out through port 28. For example, in residences having a well, the water pump pumps water through port 28 into chamber 24 which holds the water for later supply to a faucet or the like, without requiring the pump to be turned back on. Chamber 22 is provided with an air pressurizing valve 30.

Upper wall section 18 of lower shell 14 has a top terminal edge 32, FIG. 2, and a radially outwardly extending bulge 34 therebelow. Lower wall section 16 of upper shell 12 has a radial inward transition 36 engaged by top terminal edge 32 upon telescoped insertion of shells 12 and 14 during assembly, and the interface is welded at 37. Lower wall section 16 of upper shell 12 has an inner cylindrical wall portion 38 extending downwardly from transition 36 and spaced radially inwardly of bulge 34. Peripheral edge 26 of the diaphragm has an outer side 40 with a radially outwardly extending bulge 42 received in bulge 34 of upper wall section 18 of lower shell 14 prior to insertion of upper shell 12. Peripheral edge 26 of the diaphragm has an inner side 44 engaged by inner cylindrical wall portion 38 to radially compress the material of the diaphragm and provide a tight fit of bulge 42 of peripheral edge 26 of diaphragm 20 into bulge 34 of upper wall section 18 of lower shell 14 in sealed relation, all as is known in the prior art.

The present invention is shown in FIGS. 3 and 4, where like reference numerals are used from FIGS. 1 and 2 where appropriate to facilitate understanding. In accordance with the present invention, the inner side 44a of peripheral edge 26 of diaphragm 20a is provided with compression means reducing the amount of diaphragm material requiring compression and also increasing the compression of bulge 42 of peripheral edge 26 of diaphragm 20a in bulge 34 of upper wall section 18 of lower shell 14 to enhance the seal thereat. The compression means is provided by one or more internal ribs 50, 52 on inner side 44a of peripheral edge 26 of diaphragm 20a such that inner cylindrical wall portion 38 of lower wall section 16 of upper shell 12 compresses substantially only the internal ribs 50, 52 and subjects bulge 42 of peripheral edge 26 of diaphragm 20a to a direct force to provide increased compression of bulge 42, and such that the radial force on ribs 50, 52 from inner cylindrical wall portion 38 is allowed to spread ribs 50, 52 axially into less compressed areas, FIG. 4, to enable the noted reduction in the amount of diaphragm material requiring compression.

Bulge 34 of upper wall section 18 of lower shell 14 includes a radially inwardly tapered wall portion 54 extending upwardly. Rib 50 is radially opposite tapered wall portion 54. During assembly of shells 12 and 14, inner cylindrical wall portion 38 of lower wall section 16 of upper shell 12 engages and compresses rib 50 to apply a radial outward force compressing peripheral edge 26 of diaphragm 20a radially outwardly against tapered wall portion 54 of upper wall section 18 of lower shell 14 which also compresses peripheral edge 26 of diaphragm 20a downwardly into the widest radial area portion of bulge 34 of upper wall section 18 of lower shell 14 to enhance the seal thereat, all while maintaining ease of telescoped assembly of shells 12 and 14.

Second rib 52 is spaced above first rib 50 and has an innermost radial inward extension at 56 which does not extend as far radially inwardly as the innermost radial inward extension at 58 of first rib 50, to facilitate the noted telescoped insertion of shells 12 and 14 during assembly. This differential is shown at gap 60 between vertical dashed line axes 62 and 64.

Tapered wall portion 54 of upper wall section 18 of lower shell 14 merges with a cylindrical wall portion 66 thereabove extending upwardly to top terminal edge 32. Rib 52 is generally radially opposite the junction 68 of tapered wall portion 54 and upwardly extending cylindrical wall portion 66. The inner side 44a of peripheral edge 26 of diaphragm 20a has an upper surface 70 tapered radially outwardly. Upper surface 70 is radially opposite upwardly extending cylindrical wall portion 66.

Inner side 44a of peripheral edge 26 of diaphragm 20a includes a lower cylindrical surface 72 extending downwardly below rib 50 and spaced therefrom by a valley 74. Valley 74 is generally radially opposite the widest radial area portion of bulge 42 of peripheral edge 26 of diaphragm 20a. Bulge 34 of upper wall section 18 of lower shell 14 has a lower inwardly curved portion 76 merging with a cylindrical wall portion 78 of lower shell 14 therebelow and radially opposite the downwardly extending cylindrical surface 72 of inner side 44a of peripheral edge 26 of diaphragm 20a below valley 74. The outermost radial outward extension at 80 of valley 74 is axially aligned along dashed line vertical axis 64 with the innermost radial inward extension at 56 of rib 52.

Ribs 50 and 52 are spaced by a valley 82 having an outermost radial outward extension at 84 which extends farther radially outwardly than the outermost radial extension at 80 of valley 74. This differential is illustrated at gap 86 between vertical dashed line axes 64 and 88.

As seen in FIG. 4, in compressed assembled condition, valley 74 is completely filled in by diaphragm material and no gap remains to inner cylindrical wall portion 38 of lower wall section 16 of upper shell 12. Valley 82 is not completely filled in by diaphragm material, and a small gap 90 remains between valley 82 and cylindrical inner wall portion 38. Valley 74 is completely filled in and valley 82 is partially filled in by compression of the diaphragm material including axial compression.

It is recognized that various equivalents, alternatives and modifications are possible within the scope of the appended claims.

We claim:

1. A pressure vessel comprising upper and lower cylindrical vessel shells having facing open mouths received one within the other in partially overlapping telescoped relation, said upper shell having a lower wall section received within and overlapping an upper wall section of said lower shell, a flexible resilient diaphragm disposed within said vessel and separating the latter into variable volume chambers, said diaphragm having a peripheral edge received between said lower wall section of said upper shell and said upper wall section of said lower shell, said upper wall section of said lower shell having a top terminal edge and a radially outwardly extending bulge therebelow, said lower wall section of said upper shell having a radial inward transition engaged by said top terminal edge of said upper wall section of said lower shell upon axial telescoped insertion of said shells during assembly, said lower wall section of said upper shell having an inner cylindrical wall portion extending downwardly from said transition and spaced radially inwardly of said bulge, said peripheral edge of said diaphragm having an outer side with a radially outwardly extending bulge received in said bulge of said upper wall section of said lower shell prior to insertion of said upper shell, said peripheral edge of said diaphragm having an inner side engaged by said inner cylindrical wall portion of said lower wall section of said upper shell to radially compress the material of said diaphragm and provide a tight fit of said bulge of said peripheral edge of said diaphragm into said bulge of said upper wall section of said lower shell in sealed relation, said inner side of said peripheral edge of said diaphragm having compression means reducing the amount of diaphragm material requiring compression and also increasing the compression of said bulge of said peripheral edge of said diaphragm in said bulge of said upper wall section of said lower shell to enhance the seal thereat, wherein said compression means comprises one or more internal ribs on said inner side of said peripheral edge of said diaphragm such that said inner cylindrical wall portion of said lower wall section of said upper shell compresses said internal ribs and subjects said bulge of said peripheral edge of said diaphragm to a direct force to provide said increased compression of said bulge of said peripheral edge of said diaphragm, and such that the radial force on said ribs from said inner cylindrical wall portion of said lower wall section of said upper shell is allowed to spread said ribs axially into less compressed areas to enable said reduction in the amount of diaphragm material requiring compression, wherien said bulge of said upper wall section of said lower shell includes a radially inwardly tapered wall portion extending upwardly, and comprising a first said rib radially opposite said tapered wall portion of said upper wall section of said lower shell, and wherein during assembly of said shells, said inner cylindrical wall portion of said lower wall section of said upper shell engages and compresses said first rib to apply a radial outward force compressing said peripheral edge of said diaphragm radially outwardly against said tapered wall portion of said upper wall section of said lower shell which also compresses said peripheral edge of said diaphragm downwardly into the widest radial area portion of said bulge of said upper wall section of said lower shell to enhance the seal thereat, all while still maintaining ease to telescoped assembly of said shells, and comprising a second said rib spaced above said first rib and having an innermost radial inward extension which does not extend as far radially inwardly as the innermost radial inward extension of said first rib, to facilitate said telescoped insertion of said shells during assembly, wherein said inner side of said peripheral edge of said diaphragm includes a lower cylindrical surface extending downwardly below said first rib and spaced therefrom by a valley, and wherein said first and second ribs and spaced by a second valley having an outermost radial outward extension which extends farther radially outwardly than the outermost radial outward extension of said first mentioned valley.

2. The invention according to claim 1 wherein said first valley is completely filled in by diaphragm material and no gap remains to said inner cylindrical wall portion of said lower wall section of said upper shell upon assembly of said shells, and wherein a small gap remains between said second valley and said cylindrical inner wall portion of said lower wall section of said upper shell upon assembly of said shells, said first valley being completely filled in and said second valley being partially filled in by compression of the diaphragm material including axial compression.

* * * * *